(12) United States Patent
Oz et al.

(10) Patent No.: US 9,225,771 B2
(45) Date of Patent: Dec. 29, 2015

(54) SHARING EXCESS COMMITTED NETWORK APPLIANCE RESOURCES

(75) Inventors: Doron Oz, Sunnyvale, CA (US); Rohit Uberoi, Karnataka (IN); Dushyant Joshi, Karnataka (IN); Senthil M. Sivakumar, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/528,956

(22) Filed: Jun. 21, 2012

(65) Prior Publication Data

US 2013/0301652 A1   Nov. 14, 2013

(30) Foreign Application Priority Data

May 9, 2012  (IN) ............................ 1419/DEL/2012

(51) Int. Cl.
    *H04J 3/16* (2006.01)
    *H04J 3/22* (2006.01)
    *H04L 29/08* (2006.01)
    *H04L 29/06* (2006.01)
    *G06F 9/50* (2006.01)

(52) U.S. Cl.
    CPC .............. *H04L 67/10* (2013.01); *G06F 9/5022* (2013.01); *H04L 69/22* (2013.01); *G06F 2209/5011* (2013.01); *G06F 2209/5014* (2013.01)

(58) Field of Classification Search
    USPC .......................................................... 370/468
    See application file for complete search history.

(56) References Cited

U.S. PATENT DOCUMENTS

| | | | |
|---|---|---|---|
| 7,606,250 B2 | 10/2009 | Shoham et al. | |
| 8,024,787 B2 | 9/2011 | Oz et al. | |
| 8,149,708 B2 | 4/2012 | Oz et al. | |
| 8,170,045 B2 | 5/2012 | Pan et al. | |
| 8,533,103 B1 * | 9/2013 | Certain et al. | 705/37 |
| 2007/0133407 A1 * | 6/2007 | Choi et al. | 370/230 |
| 2010/0262860 A1 * | 10/2010 | Sargor et al. | 714/4 |
| 2011/0213886 A1 * | 9/2011 | Kelkar et al. | 709/226 |
| 2012/0027015 A1 | 2/2012 | Carney et al. | |
| 2012/0096165 A1 * | 4/2012 | Madduri et al. | 709/226 |
| 2012/0096167 A1 * | 4/2012 | Free et al. | 709/226 |
| 2013/0111260 A1 * | 5/2013 | Reddy et al. | 714/4.11 |
| 2013/0219036 A1 * | 8/2013 | Gusev et al. | 709/223 |

* cited by examiner

*Primary Examiner* — Edan Orgad
*Assistant Examiner* — Rebecca Song
(74) *Attorney, Agent, or Firm* — The Law Office of Kirk D. Williams

(57) ABSTRACT

In one embodiment, excess committed network appliance resources are shared for providing services within a network appliance. One approach maintains service resources in a committed service resource pool and one or more other pools of service resources. Service resources are taken from a corresponding pool as needed. Service resources are reallocated to the committed resource pool as needed to ensure that service resources are available to service corresponding packet streams at their corresponding committed rate. Examples of such services provided by a network appliance include, but are not limited to, network address translation (NAT), firewall, Internet Protocol Security (IPsec), virtual private network (VPN), or deep packet inspection (DPI) services.

22 Claims, 5 Drawing Sheets

SHARING EXCESS COMMITTED NETWORK APPLIANCE RESOURCES

TECHNICAL FIELD

The present disclosure relates generally to sharing of service resources used within a network appliance in its processing of packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Different types of communications services are provided by a network appliance. Examples of these services include, but are not limited to, network address translation (NAT), firewall, Internet Protocol Security (IPsec), virtual private network (VPN), or deep packet inspection (DPI) services. To provide one of these services, the network appliance uses service resources of a limited set of service resources of the network appliance.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
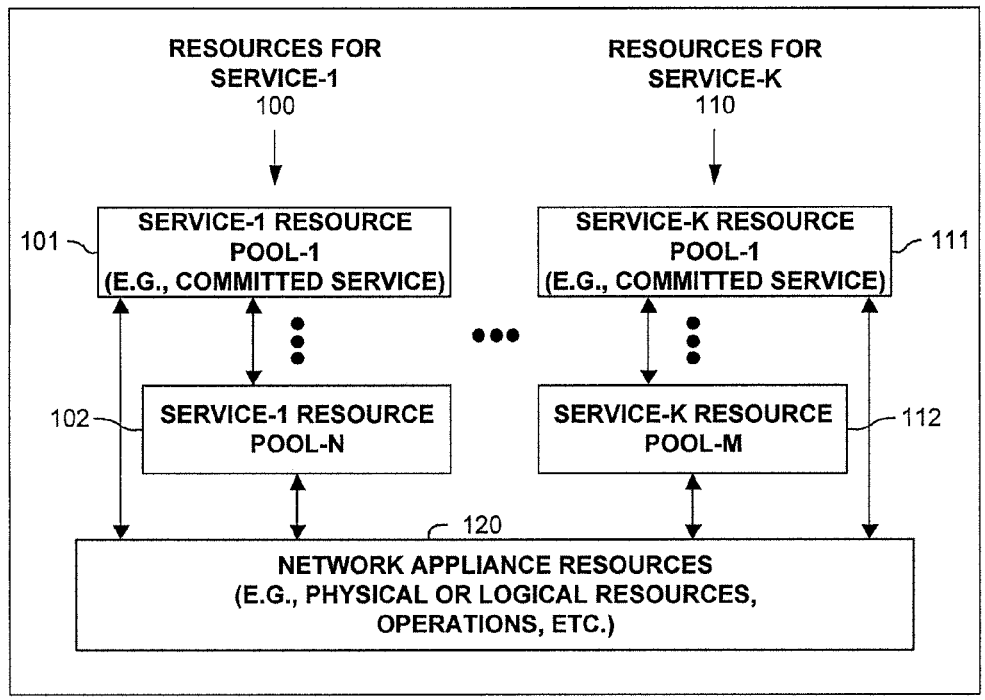
FIG. 1A is a block diagram illustrating the sharing of service resources according to one embodiment.

Disclosed are, inter alia, methods, apparatus, computer-storage media, mechanisms, and means associated with sharing excess committed network appliance resources. In one embodiment, a network appliance maintains service resources to be available via a committed service resource pool and to be available via one or more other pools of service resources. A particular service resource is acquired from the committed service resource pool, and then, the particular service resource is used to service packet traffic associated with a committed service level. A second particular service resource is acquired from a specific pool of said one or more other pools of service resources, and then, the second particular service resource is used to service packet traffic associated with a service level other than the committed service level. As required to ensure that the committed service resource pool always has resources available, one or more service resources are shifted from the specific pool to the committed resource pool in response to the committed service resource pool being deficient in service resources.

In one embodiment, the committed service resource pool is considered deficient in service resources when the amount of service resource sources currently available in the committed service resource pool is not sufficient to guarantee that the committed service resource pool will not run out of service resources for servicing packet traffic associated with a committed service level.

In one embodiment, a portion of the service resources of the network appliance are preallocated to the committed service resource pool; wherein this preallocated portion is less than all of the service resources required to provide services to all users at their committed rate.

One embodiment includes classifying a received particular packet to determine that the particular packet is associated with the committed service level; wherein said operation of acquiring the particular service resource from the committed service resource pool, and then using the particular service resource to service packet traffic associated with the committed service level is performed in response to said determination that the received particular packet is associated with the committed service level.

One embodiment includes classifying a received particular packet to determine that the particular packet is not associated with the committed service level; wherein said operation of acquiring the second particular service resource from the specific pool of said one or more other pools of service resources, and then using the second particular service resource to service packet traffic associated with the service level other than the committed service level is performed in response to said determination that the received particular packet is not associated with the committed service level.

In one embodiment, the network appliance performs a second service associated using a second committed service resource pool and a second one or more other pools of service resources. Service resources are reallocated from the committed service resource pool or said one or more other pools of service resources to the second committed service resource pool or said second one or more other pools of service resources; and wherein the first service and the second service are different services from a group of services consisting of network address translation (NAT), firewall, Internet Protocol Security (IPsec), virtual private network (VPN), or deep packet inspection (DPI) services.

In one embodiment, said service resources available via the committed service resource pool and available via said one or more other pools of service resources are identifiable service resources required for providing network address translation (NAT). In one embodiment, said identifiable service resources include Internet Protocol (IP) addresses and port numbers.

In one embodiment, said service resources available via the committed service resource pool and available via said one or more other pools of service resources are identifiable service resources required for providing firewall services. In one embodiment, said identifiable service resources include memory or data structure entries.

In one embodiment, said service resources available via the committed service resource pool and available via said one or more other pools of service resources are identifiable service resources required for providing Internet Protocol Security (IPsec) services. In one embodiment, said identifiable service resources include memory or data structure entries, or processing resources.

In one embodiment, said service resources available via the committed service resource pool and available via said one or more other pools of service resources are identifiable service resources required for providing virtual private network (VPN) services. In one embodiment, said identifiable service resources include memory or data structure entries, or encryption processing resources.

In one embodiment, said service resources available via the committed service resource pool and available via said one or more other pools of service resources are identifiable service resources required for providing deep packet inspection (DPI) services. In one embodiment, said identifiable service resources include memory or data structure entries, or packet inspection processing resources.

2. Description

Disclosed are, inter alia, methods, apparatus, computer-storage media, mechanisms, and means associated with sharing excess committed network appliance resources.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

FIG. 1A illustrates a block diagram of service resource pools (101-102, 111-112) used in one embodiment. A network appliance has a limited set of resources for providing services, such as, but not limited to, network address translation (NAT), firewall, Internet Protocol Security (IPsec), virtual private network (VPN), or deep packet inspection (DPI) services. Such resources include, but are not limited to, memory, data structure entries (e.g., firewall session table entries), associative memory entries, processing operations, deep packet inspection operations, encryption resources, port bandwidth, etc.

For example, an end-user browser session may use on the order of ten different network sessions, each of which requiring a separate NAT address (e.g., a combination of IP address and port number). A network appliance has only a limited number of such resources, which may be less than the number of NAT addresses required to provide service to all requestors.

Services that can be provided by a network appliance are often oversubscribed to users (e.g., other service providers, end users), as not all users will use their allotment of resources at the same time. Thus, some mechanism for sharing of these resources is employed in one embodiment. Also, service providers also often sell service guarantees to customers, such as a committed service level that will support a specified number of service instances (e.g., will support n NAT or firewall sessions). However, first, there may be not enough service resources to support all committed services at the same time. Further, if all of these service resources are always allocated to provide all committed services, there may not be enough service resources to provide non-committed services that could be provided using service resources that are not currently being used.

One embodiment provides for the sharing of excess committed service resources using pools (101-102, 112-112) of resources of the network appliance. A network appliance may provide only a single service, or it might provide multiple services (which may be the same or different types of services per customer, for example). Network appliance resources 120 (e.g., the resources of the network appliance for providing services) are partially or fully allocated between the resources available for providing one or more services indicated as services 1-K (100, 110). These network appliance resources may be reallocated as desired during the operation of the network appliance.

These network resources are allocated as service resources in service resource pools (101-102, 111-112). For example, a service resource may include one IP address, one IP address and port number; one entry in an associative memory and one entry in a session table; memory locations; data structure entries, etc. The allocation of network appliance resources is flexible to meet the needs of the provided services.

Each service 1-K (100, 110) typically has a set of multiple service pools (101-102, 111-112), such as one or more for each level of service to be provided. Service resources can be shifted among resource pools as required to make service resources available for providing corresponding services to packets/streams of packets. In one embodiment, service resource pools 101 and 111 are used for providing service resources for implementing committed level(s) of services. In one embodiment, service resources are shifted among service resource pools (101-102, 111-112) and possibly among service resources (100, 110) to ensure each committed service resource pool (101, 111) always has sufficient resources needed in the short run, while allowing other "excess" service resources (e.g., service resources not currently in use, but otherwise would be consumed by providing a committed level of service) to be used in providing a service to other service levels via another service pool (102, 112).

Figure 1B:
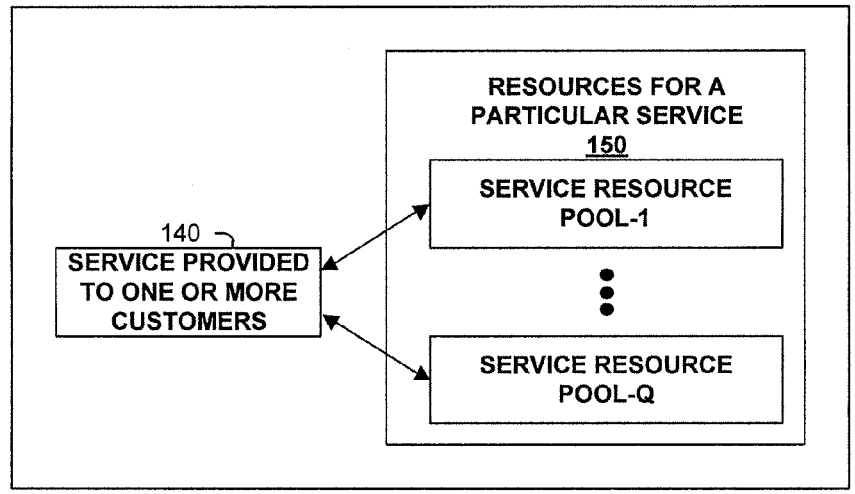
FIG. 1B is a block diagram illustrating the sharing of service resources according to one embodiment.

FIG. 1B illustrates that, in one embodiment, service resources available for providing a particular service 150 are allocated among multiple services pools. Services are provided to packets/streams of packets of one or more customers (140) by using service resources from a corresponding service resource pool of the particular service 150.

Figure 2:
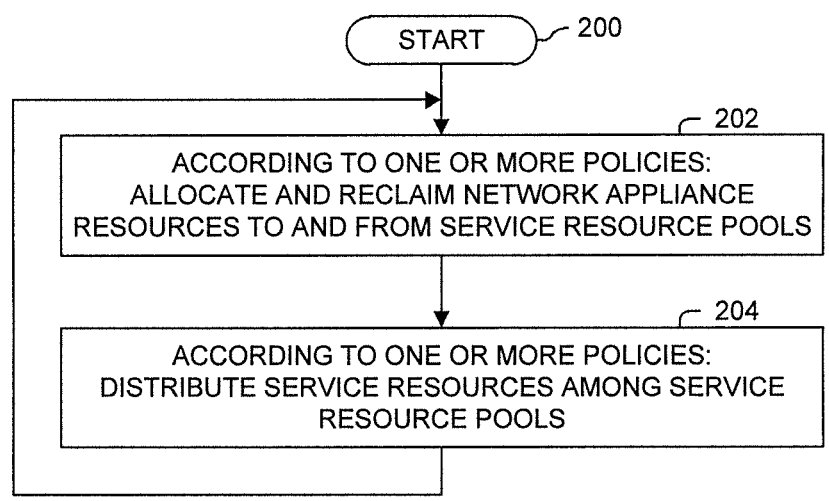
FIG. 2 illustrates a process according to one embodiment.

FIG. 2 illustrates a process performed in one embodiment. Processing begins with process block 200. In process block 202, network appliance resources are distributed (e.g., allocated and/or reclaimed) from service resource pools according to one or more policies defined for the network appliance. In process block 204, service resources are distributed within service resource pools according to one or more policies defined for the network appliance. Processing returns to process block 202 to redistribute network appliance resources and service resources according to one or more policies defined for the network appliance.

Figure 3:
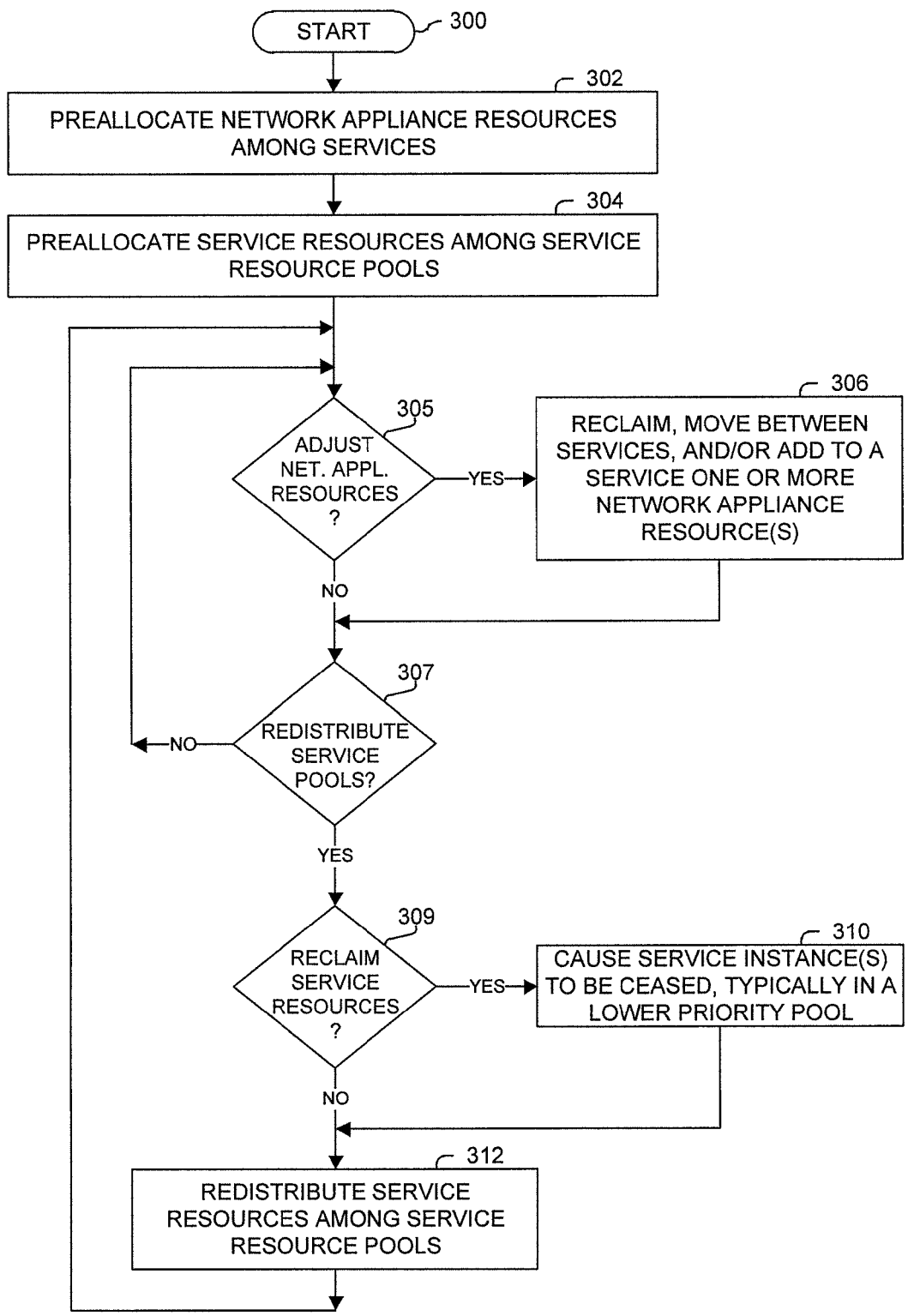
FIG. 3 illustrates a process according to one embodiment.

FIG. 3 illustrates a process performed in one embodiment for distributing network appliance resources among service(s), and service resources among service resource pools. Processing begins with process block 300. In process block 302, network appliance resources are preallocated (e.g., initially allocated) among one or more services to be provided by a network appliance based on one or more policies. In process block 304, service resources are preallocated, according to one or more policies, among service resource pools for providing each service. In this manner, a preallocated amount of service resources can be provided to each service resource pool for providing a committed service, while allowing excess service resources to be available for providing other levels of service when not required for providing a committed level of service.

In one embodiment, network appliance resources are adjusted among service(s) according to one or more policies implemented in the network appliance as represented in process blocks 305-306. As determined in process block 305, if network appliance resources are to be adjusted, then in process block 306, one or more network appliance resources are shifted between services, or simply allocated or deallocated to one or more services. Processing then continues with process block 307.

In one embodiment, service resources are adjusted among service resource pools according to one or more policies implemented in the network appliance as represented in process blocks 307-312. As determined in process block 307, if service resources are not to be redistributed among service resource pools of one or more services, then processing returns to process block 305, else processing continues with process block 309. As determined in process block 309, if service resource(s) need to be reclaimed that are currently in use, then in process block 310 (else processing continues to process block 312), such service resources are reclaimed, typically by causing one or more service instances to cease, typically that were allocated from a lower priority service level pool. For example, a service instance using excess service resources would be a candidate for freeing up service resources that can be shifted to a committed service resource pool. In process block 312, service resources are shifted among service resource pools of one or more services. For example, if the amount of service resources in a committed service resource pool drops below a threshold amount (e.g., a deficient amount of service resources currently available) indicative that more service resources are required to guarantee that the pool will always have sufficient service resources to handle any new committed level of service instances, then service resources are shifted to the committed service resource pool. Processing returns to process block 305.

Figure 4:
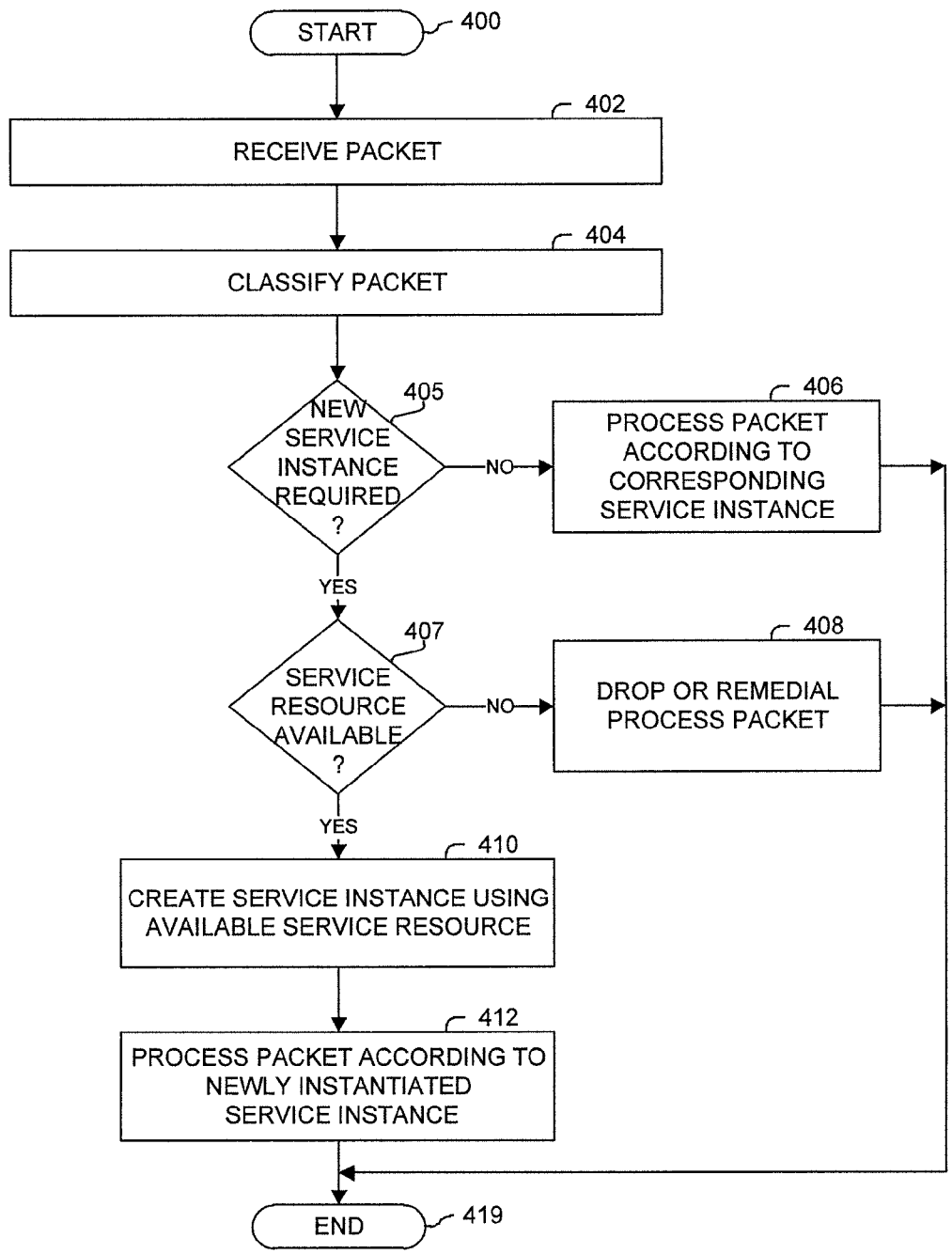
FIG. 4 illustrates a process according to one embodiment.

FIG. 4 illustrates a process performed in one embodiment for providing services by a network appliance. Processing begins with process block 400. In process block 402, a packet is received by the network appliance. In process block 404, the packet is classified (e.g., its classification is identified based on one or more fields of the packet, deep packet inspection, on which interface and/or virtual local area network the packet was received, etc.).

As determined in process block 405, if a new service instance is not required (e.g., the packet is part of a stream of packets for which a service is already being provided by the network appliance), then in process block 406 (else to process block 407), the packet is processed according to the service instance. Processing of the flow diagram of FIG. 4 is complete as indicated by process block 419.

A new service instance is required as determined by process block 405. As determined in process block 407, if there are not sufficient service resource(s) available in a service resource pool corresponding to the classification of the received packet, then in process block 408 (else to process block 410), the packet is dropped or remedially processed. Processing of the flow diagram of FIG. 4 is complete as indicated by process block 419.

Otherwise, processing continues with process block 410, wherein a service instance is created using one or more service resources available in the service resource pool corresponding to the classification of the packet performed in process block 404. In process block 412, the packet is processed according to the new service instance. Processing of the flow diagram of FIG. 4 is complete as indicated by process block 419.

Figure 5A:
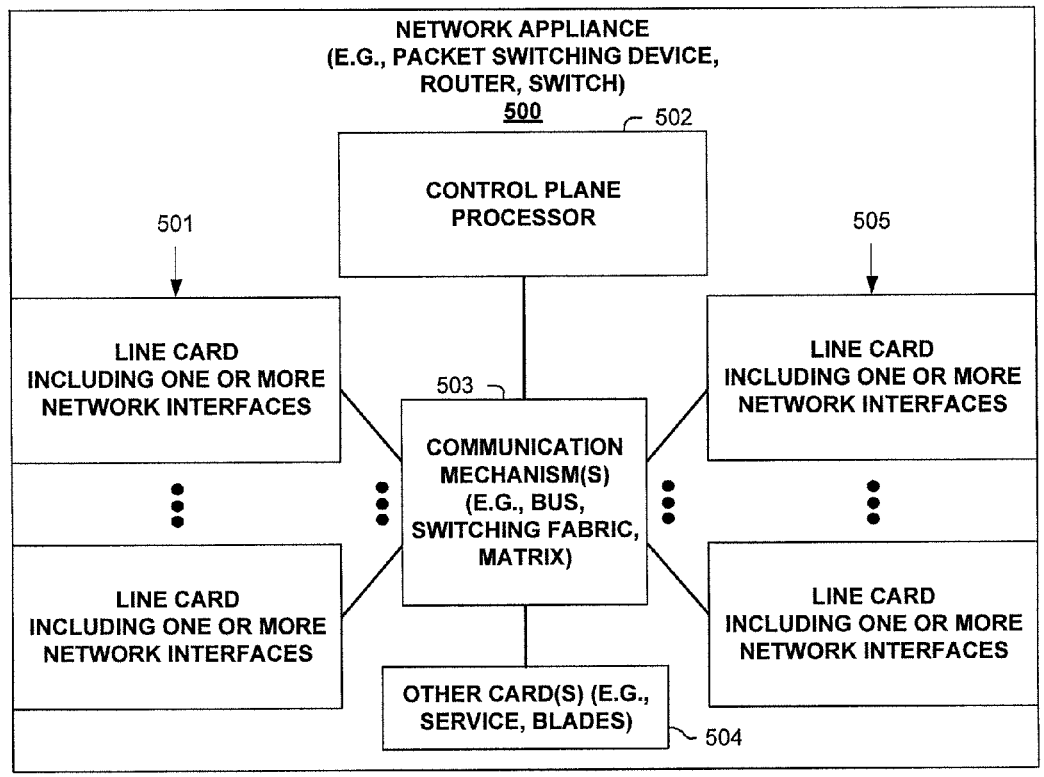
FIG. 5A illustrates a network appliance according to one embodiment.

One embodiment of network appliance 500 (e.g., packet switching device, router, switch, bridge) is illustrated in FIG. 5A. As shown, network appliance 500 includes multiple line cards 501 and 505, each with one or more network interfaces for termination communications links (e.g., possibly part of a multichassis bundle). Additionally, network appliance 500 also has a control plane processor 502 for managing the control plane. Network appliance 500 also includes other cards 504 (e.g., service cards, blades), and some communication mechanism 503 (e.g., bus, switching fabric, matrix) for allowing its different entities 501, 502, 504 and 505 to communicate. Note, as used herein, a network processing unit refers to a network processor and memory for use in processing of packets (e.g., including providing a service). A line card can have a single network processing unit, or may have multiple network processing units.

Figure 5B:
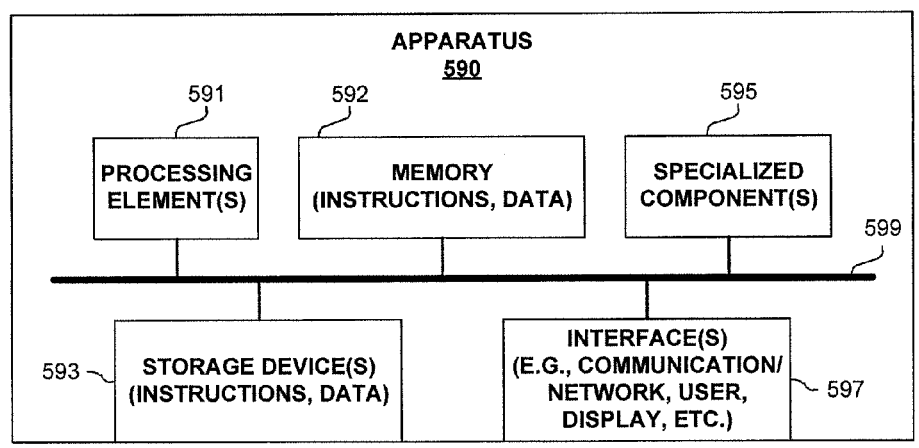
FIG. 5B illustrates an apparatus according to one embodiment.

FIG. 5B is a block diagram of an apparatus 590 used in one embodiment associated with sharing excess committed network appliance resources. In one embodiment, apparatus 590 performs one or more processes corresponding to one of the flow diagrams illustrated or otherwise described herein, and/or illustrated in another diagram or otherwise described herein.

In one embodiment, apparatus 590 includes one or more processing element(s) 591, memory 592, storage device(s) 593, specialized component(s) 595 (e.g. optimized hardware such as for performing lookup and/or service processing operations, etc.), and interface(s) 597 for communicating information (e.g., sending and receiving packets over links of a multichassis bundle, user-interfaces, displaying information, etc.), which are typically communicatively coupled via one or more communications mechanisms 599, with the communications paths typically tailored to meet the needs of a particular application.

Various embodiments of apparatus 590 may include more or fewer elements. The operation of apparatus 590 is typically controlled by processing element(s) 591 using memory 592 and storage device(s) 593 to perform one or more tasks or processes. Memory 592 is one type of computer-readable/computer-storage medium, and typically comprises random access memory (RAM), read only memory (ROM), flash memory, integrated circuits, and/or other memory components. Memory 592 typically stores computer-executable instructions to be executed by processing element(s) 591 and/or data which is manipulated by processing element(s) 591 for implementing functionality in accordance with an embodiment. Storage device(s) 593 are another type of computer-readable medium, and typically comprise solid state storage media, disk drives, diskettes, networked services, tape drives, and other storage devices. Storage device(s) 593 typically store computer-executable instructions to be executed by processing element(s) 591 and/or data which is manipulated by processing element(s) 591 for implementing functionality in accordance with an embodiment.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    allocating network appliance resources of a network appliance to service resources of a particular service of a plurality of services;
    maintaining, by the network appliance, said service resources available via a committed service resource pool and available via one or more other pools of service resources, wherein each of the committed service resource pool and said one or more other pools of service resources is shared among multiple requesters, and with the committed service resource pool containing particular service resources of said service resources for providing oversubscribed committed service levels in contrast to said one or more other pools of service resources including excess service resources of said service resources not currently in use but otherwise would be consumed by providing all of said oversubscribed committed service levels, wherein said oversubscribed committed service levels means that all of the oversubscribed committed service levels are guaranteed to always be available to customers but cannot be simultaneously satisfied as there are not enough of said service resources available to the network appliance to simultaneously provide all of said oversubscribed service levels;
    acquiring a particular service resource from the committed service resource pool, and then using the particular service resource to service packet traffic associated with a committed service level of said oversubscribed service levels;
    acquiring a second particular service resource from a specific pool of said one or more other pools of service resources, and then using the second particular service resource to service packet traffic associated with an excess service level that is not one of said oversubscribed service levels; and
    shifting one or more service resources from the specific pool to the committed resource pool in response to the committed service resource pool being deficient in service resources.

2. The method of claim 1, wherein the committed service resource pool is considered as said being deficient in service resources when the amount of service resource sources currently available in the committed service resource pool is not sufficient to guarantee that the committed service resource pool will not run out of service resources for servicing packet traffic associated with the committed service level of said oversubscribed committed service levels.

3. The method of claim 1, wherein said service resources available via the committed service resource pool and available via said one or more other pools of service resources are identifiable service resources required for providing network address translation (NAT).

4. The method of claim 3, wherein said identifiable service resources include Internet Protocol (IP) addresses and port numbers.

5. The method of claim 1, wherein said service resources available via the committed service resource pool and available via said one or more other pools of service resources are identifiable service resources required for providing firewall services.

6. The method of claim 5, wherein said identifiable service resources include memory or data structure entries.

7. The method of claim 1, wherein said service resources available via the committed service resource pool and available via said one or more other pools of service resources are identifiable service resources required for providing Internet Protocol Security (IPsec) services.

8. The method of claim 7, wherein said identifiable service resources include memory or data structure entries, or processing resources.

9. The method of claim 1, wherein said service resources available via the committed service resource pool and available via said one or more other pools of service resources are identifiable service resources required for providing virtual private network (VPN) services.

10. The method of claim 9, wherein said identifiable service resources include memory or data structure entries, or encryption processing resources.

11. The method of claim 1, wherein said service resources available via the committed service resource pool and available via said one or more other pools of service resources are identifiable service resources required for providing deep packet inspection (DPI) services.

12. The method of claim 11, wherein said identifiable service resources include memory or data structure entries, or packet inspection processing resources.

13. The method of claim 1, wherein said maintaining service resources available via a committed service resource pool includes preallocating a portion of the service resources of the network appliance to the committed service resource pool; wherein the portion is less than all of the service resources required to provide services to all users at their committed rate.

14. The method of claim 1, comprising: classifying a received particular packet to determine that the particular packet is associated with the committed service level; and
wherein said operation of acquiring the particular service resource from the committed service resource pool and then using the particular service resource to service packet traffic associated with the committed service level includes creating a new service instance that is then used to said service packet traffic associated with the committed service level, with said creation of the new service instance being performed in response to said determination that the received particular packet is associated with the committed service level.

15. The method of claim 1, comprising: classifying a received particular packet to determine that the particular packet is not associated with the committed service level; and
wherein said operation of acquiring the second particular service resource from the specific pool of said one or more other pools of service resources and then using the second particular service resource to service packet traffic associated with the excess service level includes creating a new service instance that is then used to said service packet traffic associated with the excess service level, with said creation of the new service instance being performed in response to said determination that the received particular packet is not associated with the committed service level.

16. The method of claim 1, wherein the network appliance performs a second service associated with a second committed service resource pool and a second one or more other pools of service resources;
wherein the method includes: reallocating service resources from the committed service resource pool or said one or more other pools of service resources to the second committed service resource pool or said second one or more other pools of service resources; and
wherein the first service and the second service are different services from a group of services consisting of network address translation (NAT), firewall, Internet Protocol Security (IPsec), virtual private network (VPN), or deep packet inspection (DPI) services.

17. The method of claim 1, wherein said shifting one or more service resources from the specific pool to the committed resource pool in response to the committed service resource pool being deficient in service resources includes: in response to the committed service resource pool being deficient in service resources ceasing the operation of a service instance assigned a particular service resource of said service resources to free up the particular service resource of said one or more service resources said shifted from the specific pool to the committed resource pool in response to the committed service resource pool being deficient in service resources.

18. The method of claim 1, wherein the network appliance is a packet switching device.

19. A method, comprising:
allocating network appliance resources of a network appliance to service resources of a particular service of a plurality of services to be provided by the network appliance;
maintaining, by the network appliance, a plurality of service resource pools shared among a plurality of requesters, including a committed service resource pool and a second service resource pool, with the committed service resource pool containing particular service resources of said service resources for providing oversubscribed committed service levels in contrast to the second service resource pool including excess service resources of said service resources not currently in use but otherwise would be consumed providing all of said oversubscribed committed service levels; wherein said maintaining the plurality of service resource pools includes shifting service resources between the committed service resource pool and second service resource pool such that some service resources are always available in the committed service resource pool, while allowing currently not in use oversubscribed excess service resources to be used via the second service resource pool, wherein said oversubscribed committed service levels means that all of the oversubscribed committed service levels are guaranteed to always be available to customers but cannot be simultaneously satisfied as there are not enough of said service resources available to the network appliance to simultaneously provide all of said oversubscribed service levels
acquiring a particular service resource from the committed service resource pool, and then using the particular service resource to service packet traffic associated with a committed service level of said oversubscribed service levels; and
acquiring a second particular service resource from the second service resource pool, and then using the second particular service resource to service packet traffic associated with an excess service level that is not one of said oversubscribed service levels.

20. The method of claim 19, wherein said service resources available via the committed service resource pool and available via the second service resource pool are identifiable service resources required for providing network address translation (NAT), firewall, Internet Protocol Security (IPsec), virtual private network (VPN), or deep packet inspection (DPI) services.

21. A network appliance, comprising:
a plurality of interfaces configured to send and receive packets; and
one or more service processing engines configured to perform operations, including:
allocating network appliance resources of a network appliance to service resources of a particular service of a plurality of services;
maintaining said service resources available via a committed service resource pool and available via one or more other pools of service resources, wherein each of the committed service resource pool and said one or more other pools of service resources is shared among multiple requesters, and with the committed service resource pool containing particular service resources of said service resources for providing oversubscribed committed service levels in contrast to said one or more other pools of service resources including excess service resources of said service resources not currently in use but otherwise would be consumed by providing all of said oversubscribed committed service levels, wherein said oversubscribed committed service levels means that all of the oversubscribed committed service levels are guaranteed to always be available to customers but cannot be simultaneously satisfied as there are not enough of said service resources available to the network appliance to simultaneously provide all of said oversubscribed service levels;

acquiring a particular service resource from the committed service resource pool, and then using the particular service resource to service packet traffic associated with a committed service level of said oversubscribed service levels;

acquiring a second particular service resource from a specific pool of said one or more other pools of service resources, and then using the second particular service resource to service packet traffic associated with an excess service level that is not one of said oversubscribed service levels; and shifting one or more service resources from the specific pool to the committed resource pool in response to the committed service resource pool being deficient in service resources.

22. The network appliance of claim 21, wherein said service resources available via the committed service resource pool and available via said one or more other pools of service resources are identifiable service resources required for providing network address translation (NAT), firewall, Internet Protocol Security (IPsec), virtual private network (VPN), or deep packet inspection (DPI) services.

* * * * *